United States Patent [19]

Alexander

[11] Patent Number: 4,624,982

[45] Date of Patent: Nov. 25, 1986

[54] METHOD OF TEMPORARILY INHIBITING THE SWELLABILITY OF WATER SWELLABLE CLAYS AND COMPOSITIONS

[75] Inventor: William Alexander, Naperville, Ill.

[73] Assignee: American Colloid Company, Skokie, Ill.

[21] Appl. No.: 720,559

[22] Filed: Apr. 5, 1985

[51] Int. Cl.$^4$ ................................................ C08K 3/34
[52] U.S. Cl. .................................... 524/446; 524/447; 524/547; 524/557
[58] Field of Search ............................... 524/446, 447

[56] References Cited

U.S. PATENT DOCUMENTS

| | | | |
|---|---|---|---|
| 3,764,530 | 10/1973 | Burland et al. | 526/223 |
| 3,985,659 | 10/1976 | Felicetta et al. | 524/446 |
| 3,986,365 | 10/1976 | Hughes | 106/900 |
| 4,084,382 | 4/1978 | Clem | 524/65 |
| 4,087,365 | 10/1978 | Clem | 252/8.5 A |
| 4,279,547 | 7/1981 | Clem | 406/90 |
| 4,316,833 | 2/1982 | McGroarty | 524/447 |

FOREIGN PATENT DOCUMENTS 734551  8/1961  Canada ................................ 524/447

*Primary Examiner*—Herbert J. Lilling

*Attorney, Agent, or Firm*—Mason, Kolehmainen, Rathburn & Wyss

[57] ABSTRACT

A method of temporarily inhibiting the swelling capacity of a water-swellable clay composition in contact with water includes mixing with a water-swellable clay a water soluble anionic polymer having a weight average molecular weight of about 2,000 to about 150,000 and water. The water soluble anionic polymers temporarily inhibit the swelling capacity of the water-swellable clays to decrease the viscosity of the clay slurry for transport, such as by pumping to a further treatment station such as a drier station. Also disclosed are the clay-water-anionic polymer compositions. The water soluble anionic polymers having a weight average molecular weight in the range of 2,000 to 150,000 temporarily will inhibit the swelling of a water-swellable clay so that the clay solids content of the slurry can be approximately doubled for treatment. The temporary swell-inhibiting properties of the relatively low molecular weight anionic polymers permit treatment and transportation of a clay slurry having a relatively low viscosity so that the clay solids content of the slurry can be substantially increased for primary treatment and then for transport to a secondary treatment station, such as a drier.

17 Claims, No Drawings

METHOD OF TEMPORARILY INHIBITING THE SWELLABILITY OF WATER SWELLABLE CLAYS AND COMPOSITIONS

FIELD OF THE INVENTION

The present invention is directed to a method of treating a water-swellable clay in a water slurry to temporarily inhibit the clay from swelling so that the slurry can be pumped or otherwise transported to a treatment station, such as a drier, at a lower viscosity and/or a higher solids content for unexpected savings in drying economy. More particularly, the present invention is directed to a fluid, water-swellable clay composition comprising a water swellable clay, such as bentonite, an anionic polymer having a weight average molecular weight less than about 150,000 and water. The water-swellable clay is inhibited from swelling by the action of the anionic polymer until the clay composition has been transported to a treatment station, such as a drier, whereupon the anionic polymer is treated to reduce its molecular weight to a number average molecular weight less than about 2,000 to essentially destroy the swell-inhibiting properties of the polymer, thereby enabling the clay to be dried or otherwise treated at the treatment station, and to swell upon further contact with water.

BACKGROUND OF THE INVENTION AND PRIOR ART

Water-swellable clays, such as bentonite clay, are often slurried in water for the purpose of treating the clay in some manner. For example, water-swellable clays are slurried in water for the purpose of washing the clay for contaminant removal; for the purpose of reacting the clay, for example, to provide some ion exchange, as in peptizing, for the purpose of increasing the sodium ion or other ion content of the clay; and, as disclosed in my prior application Ser. No. 530,430 filed Sept. 8, 1983, now U.S. Pat. No. 4,514,510, for hydrogen ion exchange with a suitable hydrogen ion exchange resin for the purpose of reducing the acid demand of the clay. In each case, after treatment of the clay in water slurry form, the clay then is dried to a moisture content of 0–10% by weight. The water-swellable clays are in a fully swollen form when in the water slurry and, therefore, in order to pump or otherwise transport the water-swellable clay slurry for further treatment, such as drying, the maximum clay solids content of the slurry, prior to the present invention, was approximately 5% clay by total weight of slurry. Any attempts to treat and pump or otherwise transport a water-swellable clay slurry having a solids content greater than about 5% by weight have been unsuccessful because the clay slurry, including fully hydrated clay at a solids content greater than about 5% by weight, is much too viscous for transport and for effective homogenous treatment. As shown in the Hurd U.S. Pat. No. 2,431,481, typical prior art water-swellable clay slurries include a solids content of about 2.5 to 4.6% by weight solids for treatment such as ion exchange.

As set forth in this assignee's prior U.S. Pat. No. 4,279,547 and the McGoarty U.S. Pat. No. 4,316,833, certain organic solvents have the property of inhibiting the swelling characteristics of water-swellable clays, such as bentonite. Other prior art teaches that particular additives such as the high molecular weight polymers, such as polyacrylic acid, polyacrylamide and the like increase the swellability and viscosity characteristics of a water-swellable clay dispersion, such as disclosed in this assignee's prior U.S. Pat. Nos. 3,986,365; 4,084,382; and 4,087,365. The polymers and copolymers added for the purpose of increasing the water swellability of the water-swellable clays generally are very high molecular weight polymers, e.g. 200,000 to 2 million or more molecular weight, are added in a relatively small percentage and remain with the clays in a high molecular weight form in order to continue to beneficiate the clay to achieve a higher viscosity of the clay in water.

SUMMARY OF THE INVENTION

In brief, the present invention is directed to a swell inhibited water-swellable clay composition and to a method of temporarily inhibiting the swelling capacity of the water-swellable clay in contact with water including mixing with a water-swellable clay a water soluble anionic polymer having a weight average molecular weight of about 2,000 to about 150,000 and water. The water soluble anionic polymers temporarily inhibit the swelling capacity of the water-swellable clays to decrease the viscosity of the clay slurry for transport, such as by pumping to a further treatment station such as a drier station.

In accordance with the principles of the present invention, it has been found that a water soluble anionic polymer having a weight average molecular weight in the range of 2,000 to 150,000 temporarily will inhibit the swelling of a water-swellable clay so that the clay solids content of the slurry can be approximately doubled for treatment. The temporary swell-inhibiting properties of the relatively low molecular weight anionic polymers permits treatment and transportation of a clay slurry having a relatively low viscosity so that the clay solids content of the slurry can be substantially increased for primary treatment and then for transport to a secondary treatment station, such as a drier.

In accordance with an important, new and unexpected feature of the present invention, at a secondary treatment station, the slurry is treated, such as by heating to a temperature of 200° F. to 300° F. to break down the molecular weight of the anionic polymer to less than about 2,000 weight average molecular weight to destroy the clay swell-inhibiting properties of the anionic polymer. Quite unexpectedly, molecular weight breakdown of the anionic polymer permits the water-swellable clay to substantially completely swell when again contacted with water without any residual swell inhibition remaining so that the clay can be dried and thereafter will substantially completely swell upon contact with water. The concentration of the anionic polymer having a weight average molecular weight in the range of 2,000 to 150,000 should be about 0.005% to 0.5% by weight based on the dry weight of water-swellable clay in the slurry.

Accordingly, an object of the present invention is to provide a water-swellable clay slurry wherein the clay is temporarily and reversibly inhibited from swelling.

Another object of the present invention is to provide a method of reversibly inhibiting the swell and viscosity characteristics of a water-swellable clay in contact with water.

A further object of the present invention is to provide a method of temporarily and reversibly inhibiting the hydration of a water-swellable clay by contacting the water-swellable clay with a water soluble anionic polymer having a weight average molecular weight of 2,000 to 150,000.

Still another object of the present invention is to treat a water slurry of a water-swellable clay with a water soluble anionic polymer to temporarily inhibit the clay from hydration while in contact with water to maintain a relatively low slurry viscosity, to achieve a relatively high clay solids content in the slurry, and to achieve slurry treatment of a water-swellable clay at a relatively low slurry water content.

Another object of the present invention is to provide a water-swellable clay slurry composition including 6–15% by weight water-swellable, swell inhibited clay; water; and a water soluble anionic polymer capable of inhibiting the swelling of the clay and having a weight average molecular weight of 2,000 to 150,000 and, after clay treatment, a method of treating the clay slurry composition, such as by heating the composition, to reduce the molecular weight of the anionic polymer sufficiently to destroy its swell-inhibiting characteristics to form a water-swellable clay having complete swelling properties.

The above and other objects and advantages of the present invention will become apparent from the following detailed description of the preferred embodiment.

DETAILED DESCRIPTION OF THE PREFERRED EMBODIMENT

In accordance with an important feature of the present invention it has been found that a water soluble, anionic polymer having a weight average molecular weight of about 150,000 or less will reversibly inhibit the water-swellability of a water-swellable clay dispersed or colloidally suspended in water. By inhibiting the water swelling of the clay while in contact with water, prior to clay treatment, such as ion exchange, a water-swellable clay slurry is provided having a relatively low viscosity at a given relatively high solids content to aid in processing and transport of the clay slurry, for example to a drying station. Thereafter, the swell-inhibiting characteristics of the anionic polymer is destroyed, such as by heating during drying, to provide a water-swellable clay capable of complete and uninhibited hydration upon contact with water. It has been found that the water soluble anionic polymers capable of inhibiting swellability of a water-swellable clay are broken down to smaller weight average molecular weights less than about 2,000 upon heating to a temperature of about 210°–500° F. during drying of the clay slurry so that the dried clay is no longer inhibited from swelling upon further contact with water.

The water-swellable colloidal clay utilized in the present invention is any water swellable colloidal clay which will hydrate in the presence of water, i.e., will swell when in contact with fresh (non-contaminated) water. The most surprising results are obtained with the montmorillonite clays, i.e., bentonite. A preferred bentonite is sodium bentonite which is basically a hydratable montmorillonite clay of the type generally found in the Black Hills region of South Dakota and Wyoming. This clay has sodium as a predominant exchange ion. However, the bentonite utilized in accordance with the present invention may also contain other cations such as magnesium and iron.

There are cases wherein a montmorillonite predominant in calcium ions can be converted to a high swelling sodium variety through a well known process called "peptizing". The colloidal clay utilized in this invention may be one or more peptized bentonites. The colloidal clay may also be any member of the dioctahedral or trioctahedral smectite group or mixtures thereof. Examples are Beidellite, Nontronite, Hectorite and Saponite. The colloidal clay, i.e., bentonite, generally is finely divided as known for use in water barrier panels and the like, i.e., 150 to 350 mesh.

Useful anionic polymers are the water soluble polymers of olefinic structure, that is with a structure prepared by the polymerization of at least one compound with a single aliphatic unsaturated group, which compounds are polymerized to a weight average molecular weight of 2,000 to 150,000. To be water soluble these polymers must necessarily have substituents such as carboxy acids, carboxy acid salts and carboxy acid anhydrides, and in contact with water, ionize to form polymeric ions with a substantial number of negatively charged sites. One type of compound useful in the practice of this invention is the polymer of a carboxylic acid, such as acrylic acid, methacrylic acid, crotonic acid and the sodium, potassium, calcium and ammonium salts of said polymeric acids. Copolymers of these acids, or salts thereof, and other olefinic compounds such as ethylene, proplylene, isobutylene, styrene, α-methyl styrene, vinyl acetate, vinyl formate, vinyl alkyl ethers, alkyl acrylates and alkyl halides may also be used in the practice of this invention. Copolymers of more than two olefinic substances will be useful provided that at least one of the compounds contains carboxy anhydride or carboxy salt nuclei or other nuclei which are capable of being converted chemically into one of the said carboxy strucures.

Another very useful type of polymer is the copolymers of dicarboxylic acid anhydride or derivatives thereof. These polymers are usually comprised of equal molar proportions of the dicarboxylic acid, for example maleic, fumaric, itaconic, citroconic and aconitic acids, the alkali metal, alkaline earth metal and the salts of these acids, and the partially esterified dicarboxylic acids of the type mentioned, and other olefinic monomers copolymerizable therewith, for example, ethylene, propylene, isobutylene, styrene, α-methyl styrene, vinyl acetate, vinyl chloride, vinyl formate, vinyl alkyl ethers, alkyl acrylates and alkyl methacrylates. If desired, one of the comonomeric compounds may be an amide or a quaternary ammonium salt, either substituent of which has a cationic influence, but copolymers involving such cationic substituents must necessarily have present carboxy, carboxy salt or carboxylic anhydride nuclei to overcome the cationic effects and render the whole polymer anionic. Alternatively the maleic acid may be esterified provided that ionizable carboxy groups are present in the monomer or on the maleic acid grouping, such as in the copolymer of vinyl acetate and the partial methyl ester of maleic acid. If maleic anhydride is copolymerized, it will be hydrolyzed to the acid when the aqueous bentonite slurries are prepared.

One important type of these copolymers is the polycarboxylic acids or salts thereof prepared by the hydrolysis of polyacrylonitrile, or the hydrolysis of copolymers of acrylonitrile and other olefinic monomers. In the preparation of these polymers it is necessary for the hydrolysis to proceed past the amide stage, where the polymers are cationic, to the carboxy acid or carboxy acid salt, which are anionic and therefore useful in the practice of this invention. The hydrolysis may be effected with acids as catalysts, or in the presence of alkali metal hydroxides where the corresponding alkali metal polyacrylates are produced, such as sodium polyacrylates. Alternatively, the alkali metal polyacrylates may be prepared by first polymerizing the acid and then neutralizing the resulting polymer.

Another useful polymer is the polyacrylamides, but to be effective it must have some carboxy substituents. The useful compounds of this type may be prepared by partial hydrolysis of polyacrylonitrile or by polymerization of acrylamide under conditions favoring hydrolysis, or by a polymerization followed by a separate hydrolysis step.

Other useful polymers include water-soluble polymers of sodium styrenesulfonate and the like, and copolymers with the carboxy acids, carboxy acid salts, and carboxy acid anhydrides, or with suitable monoethylenically unsaturated monomers such as ethylene, propylene, styrene, methacrylamide, vinyl alkanoic esters, vinyl chloride, maleic anhydride and the like. Other suitable polymers are the polymers and the copolymers of sulfonated alkyl acrylates and methacrylates, aminoalkyl acrylates and methacrylates and water-soluble salts of copolymers of maleic anhydride with a vinyl-aromatic compound. The preferred anionic polymers are polyacrylic acid and its water soluble salts, such as sodium polyacrylate.

The water soluble anionic polymers of the present invention, having a weight average molecular weight less than about 150,000, can be combined with the clay before or after the clay is swollen. It is particularly advantageous to add the anionic polymer to water before, or at the same time as the water-swellable clay is added to water since it is easier to completely mix the anionic polymer into the water for homogenous contact with the water-swellable clay before the clay has had a chance to hydrate and substantially increase the viscosity of the clay-water slurry. If the anionic polymer is added after the clay is substantially or completely hydrated, the anionic polymer will cause the clay to shrink or expel water, but it is more difficult to achieve a homogeneous contact of polymer with minimum water in the slurry after the clay is hydrated at high solids content, e.g. 10–15% by weight clay solids.

As set forth in the following TABLE I, the first six examples represent bentonite slurries in water having bentonite levels ranging from 10% by weight to 15% by weight before drying. The viscosity before drying and before polymer addition was measured using a #35A Fann cup, then a sodium polyacrylate polymer (fully neutralized) was added having a weight average molecular weight of 8000, in an amount of 0.25% based on the dry weight of bentonite in each slurry, and the viscosity again measured in the same manner. Quite surprisingly, the viscosity was reduced to a viscosity of only 33.2% to 38.1% of the viscosity before polymer addition. Further, the bentonite compositions after the polymer treatment of the present invention and drying, when re-slurried to a 5% by weight bentonite solids content, retained substantially 100% of the swellability of a 5% by weight solids slurry before the polymer treatment.

TABLE I

| Example | Solids Before Drying | Viscosity Before Drying No Polymer (cps) | Viscosity After Polymer Before Drying (cps) | % by wt. of Original Viscosity | Viscosity After Drying (cps) |
| --- | --- | --- | --- | --- | --- |
| 1 | 15% | 1200 | 425 | 35.4 | 360 |
| 2 | 14% | 1100 | 420 | 38.2 | 355 |
| 3 | 13% | 1250 | 415 | 33.2 | 370 |
| 4 | 12% | 1050 | 400 | 38.1 | 350 |
| 5 | 11% | 1200 | 400 | 33.3 | 371 |
| 6 | 10% | 1250 | 450 | 36.0 | 350 |

As set forth in the following TABLE II, Examples 7–16 represent bentonite slurries prepared at 12% by weight bentonite solids with the addition of various amounts (0 to 1.0% by weight) of a sodium polyacrylate polymer (fully neutralized) having a weight average molecular weight of 8000. The viscosity was measured using a #35A Fann cup after the polymer addition to determine the viscosity reduction upon each different rate of polymer addition. Further, the bentonite compositions, after the polymer treatment of the present invention and drying, when re-slurried to a 5% by weight bentonite solids content, retained substantially 100% percent of the swellability of a 5% by weight solids slurry before the polymer treatment.

TABLE II

| Example | Polymer Amount (% by wt.) | Solids Before Drying (% by wt.) | Viscosity Polymer Before Drying (cps) | Viscosity After Drying at 5% solids (cps) |
| --- | --- | --- | --- | --- |
| 7 | 0 | 12% | 1200 | 350 |
| 8 | .005 | 12% | 800 | 350 |
| 9 | .01 | 12% | 750 | 349 |
| 10 | .02 | 12% | 700 | 350 |
| 11 | .04 | 12% | 640 | 358 |
| 12 | .08 | 12% | 590 | 362 |
| 13 | .16 | 12% | 500 | 355 |
| 14 | .32 | 12% | 400 | 360 |
| 15 | .64 | 12% | 200 | 300 |
| 16 | 1.0 | 12% | 150 | 250 |

I claim:

1. A method of temporarily inhibiting the swelling of a water-swellable clay in contact with water comprising mixing with said water-swellable clay and water an anionic polymer having a weight average molecular weight of about 2,000 to about 150,000 to reduce the viscosity of the clay mixture, and thereafter treating the polymer to return the water swelling characteristics to the clay and to reduce the weight average molecular weight of the polymer to less than 2000.

2. The method of claim 1 wherein the weight average molecular weight of the anionic polymer is about 2,000 to about 100,000 prior to treatment.

3. The method of claim 1 wherein the anionic polymer is a carboxy acid polymer.

4. The method of claim 3 wherein the anionic polymer is a polymer or copolymer containing acrylic acid or a derivative of acrylic acid.

5. A method of processing a water-swellable clay slurry to temporarily inhibit the swelling of the clay to reduce the viscosity of the clay slurry for transport of the clay slurry and thereafter treating the slurry to substantially lessen the clay swelling inhibition, comprising:

mixing a water-swellable clay, water and an anionic polymer having a weight average molecular weight less than 150,000 to form a slurry including an inhibited, water-swellable clay; and thereafter treating the slurry to reduce the molecular weight of the anionic polymer to a weight average molecular weight less than 2000 to substantially decrease the swell inhibiting effect of the anionic polymer thereby permitting the clay to substantially increase its swell.

6. The method of claim 5 wherein the concentration of anionic polymer is 0.005% to 0.5% by weight based on the dry weight of water-swellable clay.

7. The method of claim 6 wherein the water swellable clay is included in an amount of greater than 5 to 15% by weight based on the total weight of water-swellable clay and water in the slurry.

8. The method of claim 5 wherein the anionic polymer is a carboxy acid polymer.

9. The method of claim 8 wherein the anionic polymer is a polymer or copolymer containing acrylic acid or a derivative of acrylic acid.

10. The method of claim 8 wherein the anionic polymer is a polymer including carboxy acid, carboxy acid salt or carboxy acid anhydride substituents and ionize in water to provide a plurality of negatively charged sites.

11. The method of claim 10 wherein the anionic polymer is a copolymer including a dicarboxylic acid anhydride or a derivative thereof.

12. The method of claim 1 wherein said treatment to increase the swell properties of the clay comprises drying the clay slurry.

13. The method of claim 12 wherein the clay slurry is heated to a temperature of at least about 200° F. during drying of the clay slurry so that the dried clay is essentially no longer inhibited from swelling upon further contact with water.

14. The method of claim 1 wherein the clay slurry is heated to a temperature of 210° to 300° F. during drying.

15. The method of claim 5 wherein said treatment to increase the swell properties of the clay comprises drying the clay slurry.

16. The method of claim 15 wherein the clay slurry is heated to a temperature of at least about 200° F. during drying of the clay slurry so that the dried clay is no longer inhibited from swelling upon further contact with water.

17. The method of claim 16 wherein the clay slurry is heated to a temperature of 210° to 300° F. during drying.

* * * * *